Figure 1:
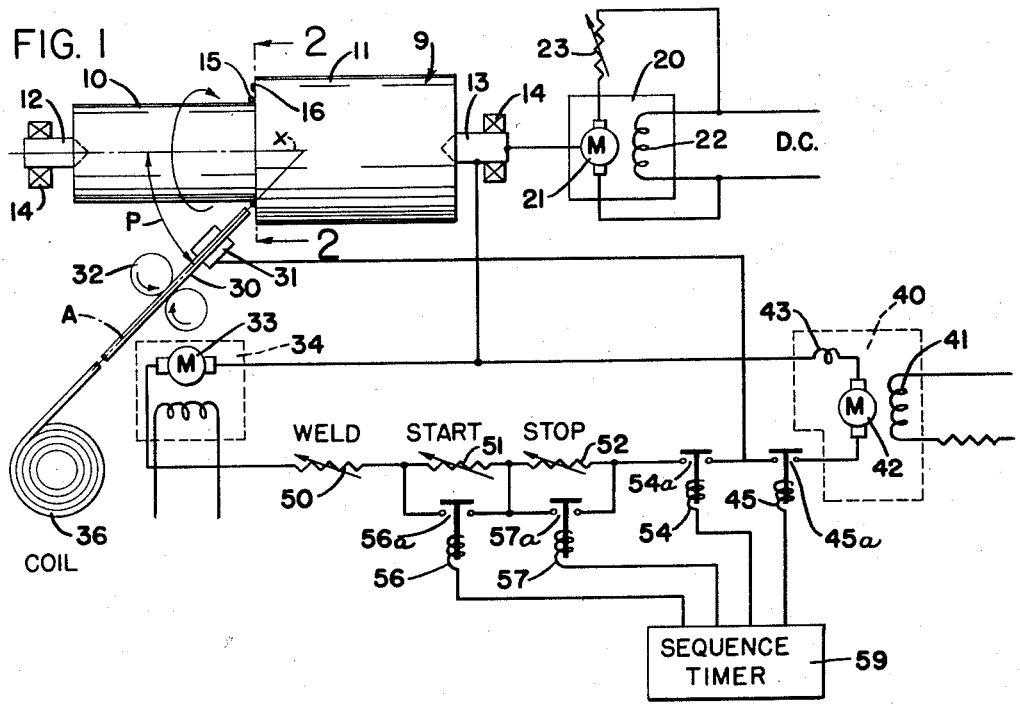

Oct. 20, 1959    G. G. LANDIS ET AL    2,909,649
OUT-OF-POSITION ARC WELDING
Filed Nov. 13, 1956

INVENTOR.
GEORGE G. LANDIS
KENNETH L. BROWN
BY WALTER G. MUSGROVE
ATTORNEY

2,909,649

OUT-OF-POSITION ARC WELDING

George G. Landis, South Euclid, Kenneth L. Brown, Garfield Heights, and Walter G. Mosgrove, Willoughby, Ohio, assignors to The Lincoln Electric Company, Cleveland, Ohio, a corporation of Ohio Application November 13, 1956, Serial No. 621,567

11 Claims. (Cl. 219—137)

This invention pertains to the art of arc welding and, more particularly, to a method and means for the arc welding of out-of-position surfaces.

The invention is particularly applicable to the automatic arc welding of steel and will be described with particular reference thereto, although it will be appreciated that the invention is equally applicable to the welding of other metals such as, without limitation, the alloy steels, titanium, aluminum, copper and magnesium.

By "automatic arc welding" is meant a process wherein a bare metallic welding electrode is continuously advanced lengthwise toward the workpiece and sidewardly relative thereto in the desired direction of the weld bead while maintaining an arc between the electrode and the workpiece to melt a trough in the workpiece and to melt off the electrode end such that the molten metal of the two will intermingle in the trough and, upon hardening, form a continuous weld bead. Ordinarily, the electrode is electrically energized as it moves past contact blocks maintained in fixed-spaced relationship relative to the workpiece surface. The invention employs a bare electrode and may thus be distinguished from welding wherein an externally coated electrode is employed which cannot readily be energized from such fixed contact blocks, although the invention is not necessarily so limited to contact blocks in fixed-spaced relationship to the workpiece.

By "out-of-position" welding is meant welding wherein the surface of the workpiece being welded is (a) sloped relative to the horizontal, (b) vertical, or (c) downwardly facing. The weld bead may be in any direction on such surfaces. The angle of slope relative to the horizontal will be referred to hereinafter as the "work angle" and can vary from 0° to 180° as the workpiece surface faces from upwardly to downwardly respectively.

In out-of-position welding, a main problem is preventing the molten metal from flowing out of the weld trough under the force of gravity and, obviously, as the work angle increases, the problem increases. The problem is greatest closest to the arc because here the metal is the hottest, and has the least viscosity. If the molten metal can be held in place until it cools sufficiently that the viscosity can hold the rapidly thickening and hardening metal in place, satisfactory welds can be made. Another problem is in forcing the electrode metal as it melts off to move to the arc pool against the force of gravity.

Heretofore, where out-of-position welding has had to be performed, it has been conventional to use hand welding; namely, an externally coated electrode held at the end opposite from the arcing end by an electrode holder, or to use automatic arc welding, and a granular flux so held relative to the weld bead that it functioned as a dam and prevented the molten weld metal from flowing out of the weld trough.

Both operations are necessarily slow. The use of the granular flux increases the speed somewhat but makes it necessary to provide means to hold the flux in position until after the weld bead has hardened, it is messy and practically impossible to perform where the workpiece surface is downwardly facing, i.e. a workpiece angle close to 180°.

In all welding, the time required to lay down a given length of weld bead was always a factor in considering the over-all cost. As will appear, the present invention, in some aspects, employs out-of-position welding to increase the speed of automatic arc welding beyond anything heretofore thought possible.

Thus, the present invention contemplates a new and improved method and electrode for electric arc welding which enables out-of-position welding to be easily performed and permits of extremely high welding speeds.

Without desiring to limit the invention, its success is believed based upon the following general theories of operation: In the course of developing the invention, it was found in automatic arc welding that as the welding current was increased, there was a critical value dependent upon the electrode diameter where the metal transfer from the electrode to the weld pool changed from a large globular or droplet form to a fine spray form which was projected from the electrode end into the weld pool in the form of a jet. This jet both carried the metal to the weld pool and exerted a considerable force on the weld pool.

By varying the angle of incidence of the electrode to the workpiece, the direction of this force on the weld pool could be readily varied and by properly selecting this angle, it was found possible to hold the molten weld metal in the weld pool against the force of gravity even with large work angles.

It was reasoned that if the maximum rate of energy input to the weld were held sufficiently low, that as soon as the arc had moved on, the deposited weld bead would be almost immediately cooled to the point where its viscosity would increase and hold the metal in the weld trough and high welding speeds could be obtained. Tests indicated this to be the case.

Thus, in accordance with the invention, a method of automatic electric arc welding of out-of-position surfaces is provided, comprising: the step of feeding on electrically energized bare metallic electrode lengthwise towards an out-of-position surface at an arc current and incident angle such that the arc force produced on the molten weld pool is sufficient to hold it against the force of gravity while simultaneously moving the electrode sidewardly relative to the workpiece surface at a speed such that even at the high currents required to produce the arc force, the maximum rate of energy input to the weld is low enough so that the molten weld pool is cooled almost immediately after the arc passes so that the increased viscosity of the weld metal will hold the bead in place.

The welding current at which the arc force commences to be a factor appears to vary either in proportion to the electrode diameter or the materials which are employed to protect the arc from the atmosphere, or both. Generally, the welding currents will be in the region of 700 amperes or more.

The incident angle is normally measured from the perpendicular to the workpiece at the point of the weld and may be varied from between 10° to 75°, depending upon the welding conditions and the work angle. Thus, the greater the incident angle, the greater the component of force parallel to the workpiece surface. This component of the arc force must, in accordance with the invention, be so balanced that the weld metal will be held in the weld pool against the force of gravity.

The rate of energy input to the weld bead is the product of the arc current and arc voltage divided by the sideward or travel speed of the electrode. This energy is of course dissipated by direct radiation to the air and by conduction to the workpiece itself. The only variable appears to be the shape of the edges before welding. Thus, if the edges are in the shape of a V before welding, there will be a slightly greater rate of heat conduction from the molten weld bead to the workpiece.

Thus, if the weld bead is to cool rapidly, as is required by the present invention, the rate of energy input to the weld bead must be held down to less than that normally employed theretofore in arc welding.

Tests have indicated that the maximum energy input to the weld bead is between 9,375–10,600 joules per inch of weld bead with the electrode as described hereinafter. Obviously this energy input can be varied within normal limits over those stated.

These energy inputs were obtained using a 5/32" electrode, welding currents of from 750 to 850 amperes, and an arc voltage of 26 volts, and a travel speed of 120 inches per minute.

With normal solid steel electrodes, these energy inputs are generally insufficient to melt off sufficient electrode per unit length of weld bead to provide a satisfactory weld bead. The melt-off rate for this energy input may be increased, however, by increasing the "stick-out" distance of the electrode beyond the energizing jaws as is taught in U.S. Patent No. 2,721,249, dated October 18, 1955, and assigned to the assignee of this application, or by using a bare, hollow metal electrode having, on the inside thereof, powdered metals, as is described in the co-pending application of George G. Landis and Donald M. Patton, Serial No. 594,918, filed June 29, 1956, and assigned to the assignee of this application or both.

Thus, by increasing the "stick-out" of the electrode beyond the energizing jaws, an increased melt-off rate of the electrode for a given arc current can be obtained. By using powdered metal on the inside of a hollow tube, increased melt-off rates for a given arc current appear to result. Obviously, a combination of the two can be employed.

As the invention particularly pertains to welding of mild steel, using the electrode of the above-referred Landis et al. application, the invention will be described with reference to the electrode of that application.

However, the invention would appear usable with the electrode described in application Serial No. 621,650 filed concurrently herewith.

In the application filed June 29, 1956, there is generally described a hollow, steel electrode containing on the inside thereof a killing agent, a de-oxidizer, a killing agent protector, and an iron oxide solvent.

The killing agent protector is described as being selected from the halides of the alkali and the alkaline earth metals which appear to coat the molten metallic particles as they move from the electrode end to the weld pool and thus protect them from the atmosphere. Additionally, these halides appear to vaporize and provide a protective, vaporous shield about the coated, molten metal particles.

These halides have a boiling temperature substantially below the boiling temperature of the electrode metal. It is believed they boil in the heat of the arc and assist in projecting the molten metal across the arc toward the weld pool with a jet or arc force sufficient to perform the function of the present invention.

Additionally in that application, the use of minor amounts of material which will break down in the arc and produce a gas at room temperature such as potassium silico fluoride were employed and possibly the generation of such gas also assists in increasing the arc force.

However, it is believed that the use of a welding current in and by itself sufficient to create a jet of molten particles from the electrode end toward the workpiece as above described is the principal reason for the success of the invention.

The use of certain of the alkali and alkaline earth metal halides appears to reduce the critical or transition current where the electrode material is transferred from the electrode end to the weld pool in the form of a jet and can thus exert the required force.

Thus, in accordance with a more limited aspect of the present invention, the alkali metal and alkaline earth metal halides having a high arc stabilizing ability are employed at least in part as the killing agent protector so as to reduce to the lowest possible amount the current required to cause the electrode materials to be forced from the electrode end in the form of a jet.

Further carrying out such a method, it was found with the relatively high current conditions required that the apparatus for carrying out the method is somewhat critical, and further in accordance with the invention, there is provided welding apparatus comprising means for rotating a cylindrical workpiece, means for energizing a welding electrode relative to a workpiece in a manner such that the welding current is proportional to the speed of feeding the electrode toward the workpiece, and means for varying the speed of the electrode feed means including a pair of resistances in electrical series relationship for controlling the speed of the motor and means for shunting out one of the resistances when the arc has been established. This arrangement may be distinguished from prior arrangements wherein the resistances were independent of each other, and the motor feed-down speed was controlled by shifting from one resistance to the other with a momentary period of de-energization of the motor while the movable relay contacts were shifting from one set of contacts to the other.

The principal object of the invention is the provision of a new and improved method of arc welding which enables out-of-position welding to be easily performed, which enables high speed welds to be obtained which is simple and easy to perform.

Another object of the invention is the provision of a new and improved method of arc welding out-of-position surfaces wherein the arc is operated in such a manner as to provide sufficient arc force to hold the molten metal in position against the force of gravity.

Still another object of the invention is the provision of a new and improved method of electric arc welding circular weld beads on round workpieces having a horizontal axis wherein out-of-position welding is employed to increase the welding speed.

Another object of the invention is provision of a new and improved method of welding out-of-position surfaces with a bare metallic electrode wherein an arc force is generated so as to hold the molten metal in the weld trough against the force of gravity.

Figure 2:
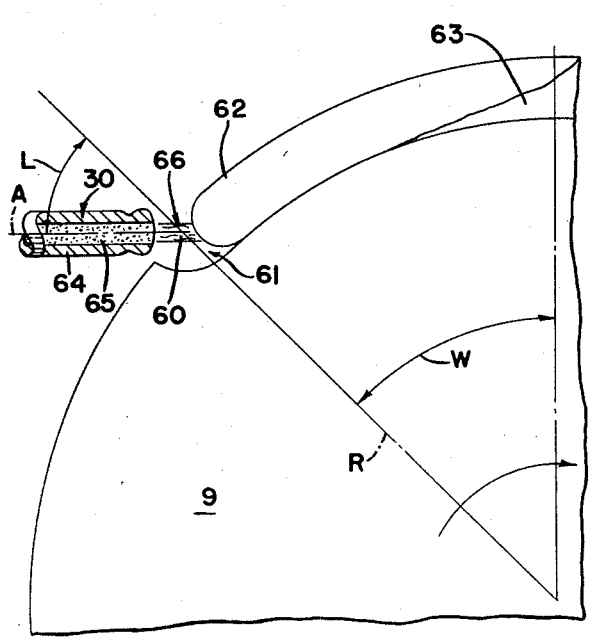
Figure 3:
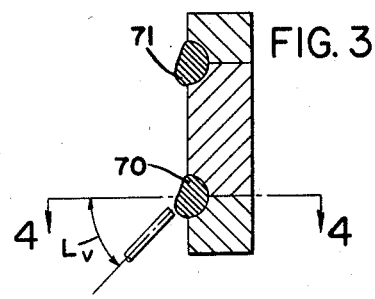
Figure 4:
Figure 4:
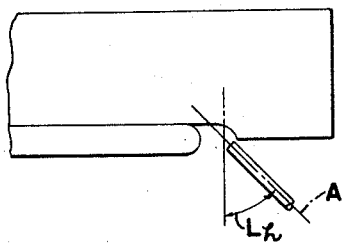

The invention may take physical form in certain parts and arrangements of parts, and certain steps and combinations of steps, preferred embodiments of which will be described in detail in this specification and illustrated in the accompanying drawing, which is a part hereof and wherein:

Figure 1 shows somewhat schematically a top elevational view of apparatus for welding a circular bead on a cylindrical workpiece, illustrating a preferred embodiment of the invention, Figure 2 is a fragmentary cross-sectional view of Figure 1 taken on the line 2—2 thereof, Figure 3 is a cross-sectional view of a workpiece having a vertical surface with a completed horizontal weld bead therein, and a second horizontal weld bead being deposited, and Figure 4 is a cross-sectional view of Figure 3 taken approximately on the line 4—4 thereof.

Referring now to the drawings wherein the showings are for the purpose of illustrating preferred embodiments of the invention only, and not for the purpose of limiting same, Figure 1 shows a pair of cylindrical workpieces 10, 11 in end-to-end abutting relationship and mounted for rotation between centers 12, 13 each in turn mounted in suitable bearings 14. Means (not shown) may be provided for moving the centers 12, 13 axially relative to each other so as to make clearance to receive new workpieces 10, 11 or to remove those which have been welded.

In the embodiment of the invention shown, a circular weld bead 15 is to be laid down around the end periphery of the member 10 and on the left end face 16 of the workpiece 11 so as to weld the two members into a single integral member which will hereinafter be referred to jointly as workpiece 9.

A motor 20 comprised of an armature 21 and a field coil 22 is mechanically connected to the center 13 so as to rotate the workpiece 9 during the welding. The direction of rotation, as is shown in Figure 2, is clockwise. The motor 20 may be energized in any suitable manner but in the embodiment shown the field coil 22 is connected directly to a D.C. source while the armature 21 is connected to the same source through a variable resistance 23, whereby the motor speed can be easily regulated.

To deposit a weld bead, an electrode 30 is positioned relative to the workpiece 9 on a line of action A in accordance with the present invention. This electrode 30 is preferably a bare metallic electrode and is advanced past energizing contact blocks 31 by means of electrode feed rolls 32 driven by the armature 33 of an electrode feed motor 34.

The electrode 30 may be of any desired length but is preferably of an indeterminate length and is supplied from a reel 36 located remotely from the feed rolls 32 and guided to the feed rolls in any desired manner.

The electrode 30 is energized relative to the workpiece 9 by means of a welding generator 40 having a field 41 and an armature 42. One terminal of the armature 42 connects through a compounding winding 43 to the workpiece 9 in any desired manner, as, for example, through the center 13 and to one terminal of the armature 33 of the motor 34. The other terminal of the armature 42 connects to the contact blocks 31 through the normally open contacts 45a of relay 45. The opposite terminal of the armature 33 connects to this opposite terminal of the armature 42 through a series of variable speed-controlling resistances, namely, a weld speed resistance 50, a start speed resistance 51, a stop speed resistance 50, the normally open contacts 54a of a relay 54, and the normally open contacts 45a. The start speed resistance 51 is shunted by the normally open contacts 56a of a relay 56 and the stop speed resistance 52 is shunted by the normally open contacts 57a of relay 57. The sequence of operation of the various relays is controlled by means of a sequence timer 59, as will appear.

During welding, the electrode 30 advances towards the workpiece 9 along the line of action A. An arc 60 between the end of the electrode 30 and the workpiece 9 cuts a trough 61 therein, as well as melting off the electrode end. The molten metal from the electrode 30 and the molten metal from the workpiece intermingle to form a molten weld pool 62 which hardens after the arc passes on to form a weld bead 63.

The electrode 30 in this embodiment is comprised of an outer hollow shell 64 of the metal which it is desired to deposit and contains on the interior thereof a material 65 capable of vaporizing in the heat of the arc to protect the arc from the atmosphere and assist in providing a jet which will impinge on the surface of the weld pool 62.

For the welding of steel, a preferred electrode 30 may be made up generally as follows:

*Example 1*

|   | Percent |
|---|---|
| Silico titanium (Se 43.5%) (Ti 45.5%) | .75 |
| Ferro titanium (Ti 40%) | 1.0 |
| Ferro manganese (86% Mn) | 2.0 |
| Sodium fluoride | 2.0 |
| Potassium silico fluoride | 2.0 |
| Potassium titanate | 1.0 |
| Iron powder | 12.0 |
| Electrode metal (in the shell 64) | Balance |
|   | 100 |

*Example 2*

|   | Percent |
|---|---|
| Silico titanium (Si 43.5%) (Ti 45.5%) | .75 |
| Ferro titanium (Ti 43.8%) | 1.0 |
| Ferro manganese (Mn 80%) | 2.0 |
| Sodium fluoride | 2.0 |
| Potassium silico fluoride | 2.0 |
| Iron powder | 15–30 |
| Electrode metal | Balance |
|   | 100 |

*Example 3*

|   | Percent |
|---|---|
| Silico titanium (Si 43.5%) (Ti 45.5%) | .75 |
| Ferro titanium (Ti 40%) | 1.0 |
| Ferro manganese (Mn 86%) | 2.0 |
| Sodium fluoride | 2.0 |
| Potassium silico fluoride | .50 |
| Potassium titanate | .50 |
| Iron powder | 10–30 |
| Electrode metal | Balance |
|   | 100 |

For the electrodes referred to in the above examples, and the V-weld shown, the optimum welding current for various diameter electrodes is as follows:

| Electrode diameter | Electrode material | Current in amperes | Arc voltage |
|---|---|---|---|
| .128 | Steel | 500– 600 | 25 |
| .135 | ----do---- | 600– 700 | 25 |
| .161 | ----do---- | 700– 850 | 25 |
| .188 | ----do---- | 900–1,000 | 25 |

The welding current determines the melt-off rate of the outer shell 64. However, as the inside of the shell contains substantial amounts of iron powder, the amount of metal actually deposited will be in excess of the amount of metal melted off from the hollow shell by the amount of powdered metal on the inside thereof.

It is to be noted that the total amount of metal deposited for any given electrode current can also be increased by increasing the "stick-out" distance, namely, the distance from the electrode energizing jaws to the arcing end of the electrode. Normally, this distance is about ¾ of an inch. By increasing it to two or more inches, the electrode melt-off rate is very substantially increased.

After selecting the desired electrode size, and the desired welding current, the rotational speed of the workpiece must then be selected so as to provide the desired amount of metal deposited per lineal inch of welding. Also, this speed much be selected so that the rate of heat energy supply is low enough so that by the time the workpiece has rotated to a point that the molten metal deposited is then subjected to the force of gravity causing it to flow in the direction of rotation, it will have congealed sufficiently that the viscosity of the metal is sufficient to prevent its flowing. Tests made in accordance with the preferred embodiment of the invention have enabled satisfactory welds to be obtained at speeds of from 100 inches to 200 inches per minute.

In welding, using the present invention, the angles of the lines of action A of the electrode 30 relative to the workpiece 9 are quite important. Thus, the line of action A forms a position angle P with the axis of rotation X of the workpiece 9. This angle P is generally adjusted so that the line of action A bisects the angle between the two surfaces forming the weld bead prior to welding. Thus, in the embodiment shown, the angle P is approximately 45°. If a butt weld were to be made between two cylindrical members of the same diameter, the angle P would be approximately 90°.

This angle is probably the least important in accordance with the invention and generally is the last to be adjusted.

The line of action A is also adjusted so that the surface of the workpiece at the point of intersection has a work angle W other than 0°. It will be noted from considering the geometry of the cross-section that the work angle W is the same as the angle between the radial line R through the point of intersection and a vertical line. Further, the line of action A has an incident angle L measured between the line of action A and the radial line R.

By providing a work angle greater than 0°, the molten metal 62 tends to flow past the electrode under the force of gravity and the tendency is of course proportional to the work angle A. The lag or incident angle gives to the arc jet 66 a force component which counteracts the force of gravity on the weld pool. The angle L is always below the perpendicular to the surface and hereafter and in the claims is always so limited.

These two angles must be adjusted in relation to each other and in relation to the surface velocity of the workpiece 9.

In actual practice, the incident or lag angle is preferably adjusted so as to provide the desired amount of penetration into the workpiece 9. The amount of penetration varies somewhat upon the amount of arc force produced, by the materials on the inside of the electrode, the arc current, the arc voltage, and other factors. Generally, it may be stated that the lag, or incident angle may vary from 5° to 75°. An angle of 15° to 30°, however, is preferred. Satisfactory tests have been run with the lag angle at 60°, although in some instances, porosity in the weld bead resulted. To prevent the porosity, smaller lag angles of around 25° are preferred even though such angles give greater penetration, the bead shape is not as good and there is a slightly greater tendency for the molten weld bead to drip; that is, to run downwardly past the electrode under the force of gravity.

The workpiece angle is selected in relation to the rotational speed of the workpiece and the lag angle. Generally it may be stated that the work angle must be increased as the rotational speed is increased and vice versa. The reason for this becomes apparent when it is noted that the direction of rotation is such that as fast as the molten weld bead is deposited, it is carried upwardly to the point where the surface is horizontal. At this point there is no tendency for the molten metal to fall out of the weld bead trough, however, immediately thereafter the workpiece surface slopes in the opposite direction and unless sufficient time has been allowed for the molten metal to congeal sufficiently, it can then flow out of the weld trough. A work angle of from 5° to 75° is within the scope of the invention. 50° to 55° is preferred. For a given rotational speed there is an increase in time allowed for the molten metal to congeal before the workpiece slopes sufficiently in the opposite direction to cause the metal, if molten, to flow out of the trough. In essence, it can be seen that the embodiment of the invention increases the work angle so that the metal has a greater length of time to congeal before it is subjected to the forces of gravity which would cause the molten metal to flow out of the weld bead. The lag angle and the arc force are then provided to offset the forces of gravity at the point where the molten metal is the most liquid and would normally tend, without the arc force, to flow past the electrode due to the workpiece angle at the point of the arc. The energy input to the weld can be a maximum here because of the increased time possible for congealing the molten metal.

In welding of the general type described in this preferred embodiment, the end of the weld bead overlaps the beginning of the weld bead. Additionally, the depositing of the weld bead must be stopped while the workpiece is moving sidewardly at a high rate of speed relative to the electrode. For satisfactory welding, tests have indicated that the following conditions are generally necessary: (1) the generator must be at full potential when the electrode strikes the workpiece. This eliminates control of the generator output by means of energizing the generator field coil 41. Accordingly, the generator 40 has its field coil 41 energized at all times, and the energization of the electrode is controlled by the contacts 45a, (2) the welding generator must have a volt-ampere curve which is stiffer or flater than ordinarily employed. This is not to say that the curve must be flat or upward because, in such cases, instability results. However, the curve must be flat enough that the weld current can be controlled by varying the electrode feed speed. The winding 43 provides such a curve, (3) the electrode feed speed must be accurately controlled and particularly during the actual welding, absolutely uniform, (4) the feed-down speed at the start of the weld must be slower than the welding speed and the shifting from the starting speed to the welding speed must be done instantaneously. It was found impossible to employ both a weld speed resistance 50 and a start speed resistance 51 with a relay which shifted the energization of the armature 33 from one to the other. Thus, it was found necessary to place the start resistance in series with the weld resistance and when it was desired to shift from the start speed to the weld speed, short out the start speed resistance.

The circuit diagram of Figure 1 shows schematically the circuit found necessary to provide successful welds in the embodiment of the invention described in this figure. Thus, in Figure 1 the sequence timer closes contacts 45a and 57a at the start of a weld. Simultaneously therewith, or immediately thereafter, the contacts 54a are closed. The motor 34 commences to run at a speed as determined by the dual setting of the resistances 50 and 51. The electrode feeds from its rest position toward the workpiece. At a predetermined time after the closing of the contact 54a, or if desired, at the instant that the electrode strikes the workpiece, the coil 56 is energized to close the contact 56a thus shunting out the resistance 51. The motor 34 then runs at a speed determined only by the weld speed resistance 50. The arc current is determined by this speed. At a predetermined time, based on the speed of rotation of the workpiece 9 and the circumference of the weld bead 15 to be laid down, the sequence timer de-energizes the relay 57 to open the contacts 57a. The motor 34 thus slows down to a speed as determined by the two resistances 50, 52 in series. The electrode end can be visually seen to space itself from the surface of the workpiece and the arc current goes down. Again, at a predetermined time, following the opening of the contacts 57a, the sequence timer de-energizes the relay 45 to open the contact 45a so that the arc immediately is extinguished and the electrode feed motor 34 stops with the end of the electrode in a rest position spaced from the deposited weld bead 15. The workpiece 9 may then be removed and a new one inserted. As the spacing of the electrode end from the weld bead is always the same, the sequence timer may again take over the timing of the operation and employ a timing to control the operation of the relay 56 and obtain an accurate starting of the weld bead.

It will be appreciated that in some instances, it is possible to hold the workpiece 9 stationary and rotate the electrode sidewardly around the workpiece. In such case, it will be appreciated that the workpiece angle will constantly vary from 0° through 180° and back to 0°. Alternatively, it is possible to employ two electrodes, both moving circumferentially around the workpiece in opposite directions from a 0° workpiece angle to a workpiece angle of 180°. In some cases, it may be necessary or desirable to vary the lag angle to correspond to the work angle at any given instant. This, of course, may be obtained by employing cams having a rise proportional to the work angle at the particular instant.

The invention is also applicable in the automatic welding from the "three o'clock" position; namely, welding horizontal seams in vertical plates. In such welding, the workpiece angle will be 90°, although it will be appreciate that in the making of such horizontal weld seams, the workpiece angle may be other than 90°.

As can be seen from Figure 3, the force of gravity on the deposited weld bead 70 is such as to trend to make the metal run out of the lower side of the weld trough, giving to the weld bead a lobe 71 on the lower side.

The axis of the electrode is so adjusted relative to the weld bead that the jet from the electrode end impinges upwardly on the weld bead so as to oppose this force of gravity until the molten weld pool has congealed sufficiently that the surface tension of the molten metal will hold the molten metal in position.

As will be seen from Figures 3 and 4, the lag angle has for accurate definition, two separate angles with the perpendicular from the surface of the workpiece; namely, a vertical angle $L_v$ and a horizontal angle $L_h$. The vertical angle $L_v$ is below the perpendicular and normally will be adjusted to provide the required arc force on the molten weld pool and the horizontal angle $L_h$ will determine the penetration in to the workpiece. Satisfactory welds have been obtained with a vertical lag angle $L_v$ of 15° and a horizontal lag angle $L_h$ of 0°. These angles are, of course, subject to normal variations.

It will be appreciated that the invention has been described with reference to preferred embodiments. Obviouusly, modifications and alterations will occur to others upon a reading and understanding of this specification and it is own intention to include all such modifications and alterations insofar as they come within the scope of the appended claims or the equivalent thereof.

Having thus described own invention, we claim:

1. A method of arc welding a circular bead on a round workpiece comprising the steps of rotating the workpiece about a horizontal axis, advancing an electrode lengthwise at an angle below perpendicularity to the workpiece and toward the workpiece so as to contact the workpiece at a point spaced below the top of the workpiece in a direction opposite to the direction of rotation so that the work angle is between 5 and 75 degrees, energizing the electrode with a current such that the electrode metal is moved from the electrode end to the workpiece in the form of a fine spray which is deposited on the workpiece and which substantially prevents the electrode metal just deposited on the workpiece from flowing down past said point thereon, and rotating the workpiece at a speed such that the energy input to the workpiece is in the region of 10,000 joules per inch of weld.

2. A method of arc welding a circular weld bead on a round workpiece comprising mounting said workpiece for rotation on a horizontal axis, advancing a hollow electrode containing on the inside thereof a powder of the metal to be deposited toward the workpiece so that the work angle at the point of engagement is between 5 and 75 degrees and the incident angle of the electrode is between 5 and 75 degrees below perpendicularity to the workpiece at said point, rotating the workpiece so that at the point of the weld the workpiece is moving upwardly, and maintaining an arc between the electrode and the workpiece during a weld which causes a spray of the electrode material to be deposited on the workpiece which substantially prevents the electrode material just deposited on the workpiece from flowing down the workpiece past said point thereon.

3. A method of claim 2 wherein the current supplied to the electrode is above 700 amperes.

4. The method of claim 2 wherein the speed of rotation and the current supplied to the electrode are such that the energy input to the workpiece is in the neighborhood of 10,000 joules per inch of weld.

5. A method of electric arc welding a circular bead on a round workpiece comprising: mounting the workpiece for rotation on a horizontal axis, advancing an electrode on a line of movement so that the work angle of the surface at the point of contact is in the neighborhood of 50 to 55 degrees and the electrode has an incident angle of from 15 to 30 degrees below perpendicularity to the surface of the workpiece at said point of contact, rotating the workpiece so that the workpiece surface at the point of contact is moving upwardly, and energizing the electrode relative to the workpiece to establish and maintain an arc which sprays material from the electrode onto the workpiece at said point of contact and holds the just-deposited material in position on the workpiece against the force of gravity by the arc force.

6. A method of electric arc welding comprising providing a hollow steel electrode having on the inside thereof materials capable of vaporizing in the heat of the arc and exerting a force on a molten weld bead, advancing such electrode towards an upwardly moving out-of-position workpiece surface and providing an incident angle of the electrode which is below perpendicularity to said workpiece surface such that the weld bead is held in position against the force of gravity by the arc force generated.

7. A method of electric arc welding out-of-position workpiece surfaces comprising the steps of maintaining an arc between the electrode end and an upwardly moving workpiece surface of a current such that the electrode metal is projected from the electrode to the workpiece surface in the form of a jet, the electrode axis having an incident angle so that said jet imposes and upward force on the weld bead opposite to the force of gravity which substantially prevents the just deposited weld bead from flowing down the workpiece, and moving the electrode sidewardly relative to the workpiece so that the energy input is on the order of 10,000 joules per inch of weld.

8. A method of electric arc welding an out-of-position surface comprising the steps of maintaining an arc between an electrode and the workpiece surface, the current in the arc being sufficient as to impose a substantial force on the molten weld pool, orienting the electrode so as to have an incident angle below perpendicularity to said workpiece surface so that said arc holds the molten weld metal against flowing downward along said workpiece surface under the force of gravity, and moving the electrode sidewardly at a speed such that the energy input to the weld is low enough that the molten metal is cooled to a high viscosity immediately after the arc has passed on whereby the molten weld metal will be held in the weld trough against the force of gravity by its own viscosity.

9. A method of arc welding a weld bead on the round surface of a workpiece which rotates in one direction about a non-vertical axis comprising the steps of: positioning the tip of a consumable welding electrode opposite a location on the surface of the workpiece which is spaced below the upper end thereof in a direction opposite to the direction of rotation of the workpiece, and, while the workpiece is rotated, maintaining an arc between said electrode tip and said location on the workpiece surface of sufficient current intensity to spray molten material from the electrode forcefully onto the workpiece and directing said arc from the electrode against the workpiece surface at an angle below perpendicularity thereto at said location thereon so that said spray exerts an upward force on the molten material just deposited on the workpiece which substantially prevents said deposited molten material from running down the workpiece past said location thereon.

10. The method of claim 9 wherein the electrode is fed toward said workpiece surface, and the rate of feed of the workpiece and the electrode current and voltage are such that the energy input to the electrode is substantially within the range from 9,375 to 10,600 joules per inch.

11. The method of claim 9 wherein said workpiece surface moves past the electrode tip at a speed substantially within the range from 100 to 200 inches per minute.

References Cited in the file of this patent

UNITED STATES PATENTS

| | | |
|---|---|---|
| 1,485,120 | Lincoln | Feb. 26, 1924 |
| 2,350,387 | Cito | June 6, 1944 |
| 2,427,350 | Carpenter et al. | Sept. 16, 1947 |
| 2,493,143 | Ingels | Jan. 3, 1950 |
| 2,504,868 | Muller et al. | Apr. 18, 1950 |
| 2,721,249 | Landis et al. | Oct. 18, 1955 |

FOREIGN PATENTS

| | | |
|---|---|---|
| 1,138,267 | France | Jan. 28, 1957 |